United States Patent
Moghaizel et al.

(10) Patent No.: US 10,970,689 B2
(45) Date of Patent: *Apr. 6, 2021

(54) SYSTEMS AND METHODS FOR DYNAMIC USER INTERFACE MODIFICATION

(71) Applicant: The Toronto-Dominion Bank, Toronto (CA)

(72) Inventors: Joe Moghaizel, Toronto (CA); Tricia Elizabeth Allen, Toronto (CA); Paul Mon-Wah Chan, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,532

(22) Filed: Dec. 12, 2019

(65) Prior Publication Data

US 2020/0118098 A1    Apr. 16, 2020

Related U.S. Application Data

(63) Continuation of application No. 15/284,829, filed on Oct. 4, 2016, now Pat. No. 10,540,642.

(51) Int. Cl.
*G06Q 40/00* (2012.01)
*G06Q 20/10* (2012.01)
(Continued)

(52) U.S. Cl.
CPC ........... *G06Q 20/10* (2013.01); *G06Q 20/108* (2013.01); *G06Q 20/14* (2013.01); *G06Q 20/24* (2013.01);
(Continued)

(58) Field of Classification Search
CPC ...................................................... G06Q 20/10
(Continued)

(56) References Cited

U.S. PATENT DOCUMENTS 8,538,827 B1 *  9/2013  Dryer ................... G06Q 30/00
                                                      705/26.1
8,989,712 B2    3/2015  Wentker
(Continued)

OTHER PUBLICATIONS

How to sign up for bank alerts on your cellphone (and why you should), Michelle Crouch Aug. 30, 2016.
(Continued)

*Primary Examiner* — Samica L Norman
(74) *Attorney, Agent, or Firm* — Rowand LLP

(57) ABSTRACT

Methods and devices for controlling display of a user interface. A computing device configured to enable data exchanges in connection with accounts, including a credit account, determines whether a requested data exchange with the credit account will result in the credit account exceeding a utilization threshold. If not, a standard interface for completing the data exchange is displayed. If the data exchange will result in exceeding the threshold, then a modified interface is displayed. The modified interface enables completion of the data exchange within a minimum time period longer than the minimum time period within which the data exchange may be completed through the standard interface. Example modifications include adding an input element or field, adding delay to display or rendering of graphics, adding pop-ups, or removing pre-populated selections or values, among others.

20 Claims, 5 Drawing Sheets

(51) Int. Cl.
 *G06Q 20/24* (2012.01)
 *G06Q 20/14* (2012.01)
 *G06Q 20/40* (2012.01)

(52) U.S. Cl.
 CPC ......... *G06Q 20/401* (2013.01); *G06Q 20/405* (2013.01)

(58) Field of Classification Search
 USPC .......................................... 705/39, 16, 26.1
 See application file for complete search history.

(56) References Cited

U.S. PATENT DOCUMENTS

2007/0106558 A1* 5/2007 Mitchell ............ G06Q 20/0453
 705/16
2011/0202414 A1 8/2011 Nallasivan et al.
2014/0358799 A1 12/2014 Kingston et al.

OTHER PUBLICATIONS

U.S. Office Action, U.S. Appl. No. 15/284,829 dated Jun. 10, 2019.

* cited by examiner

SYSTEMS AND METHODS FOR DYNAMIC USER INTERFACE MODIFICATION

CROSS REFERENCE TO RELATED APPLICATIONS

The present application is a continuation of U.S. patent application Ser. No. 15/284,829 filed on Oct. 4, 2016, the entirety of which is incorporated herein by reference.

FIELD

The present application generally relates to dynamic modification of an interface displayed on a computing device and, in particular, on modification of the interface during a data exchange operation conditional on the impact of the data exchange.

BACKGROUND

The creators of modern software for initiating and controlling transactions, particularly those relating to various accounts, strive for speed and ease-of-use. Often choices are pre-populated and transactions may be initiated and completed with very few inputs. The speed within which electronic transactions may be completed, particularly those involving credit, increases the likelihood that errors may be made. The very interfaces that are meant to provide an improved user experience by increasing the speed and ease of transactions may result in ill-considered and regretted transactions.

Nevertheless, user demand for faster, more efficient electronic transactions has lead the computing industry to design account management interfaces so as to minimize the number of inputs required for a transaction and to increase the speed within which the transaction may be specified and completed.

It would be advantageous to provide for devices and methods that still enable the benefits of a faster, easier-to-use interface, but address the potential problems associated with speedy transaction completion.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
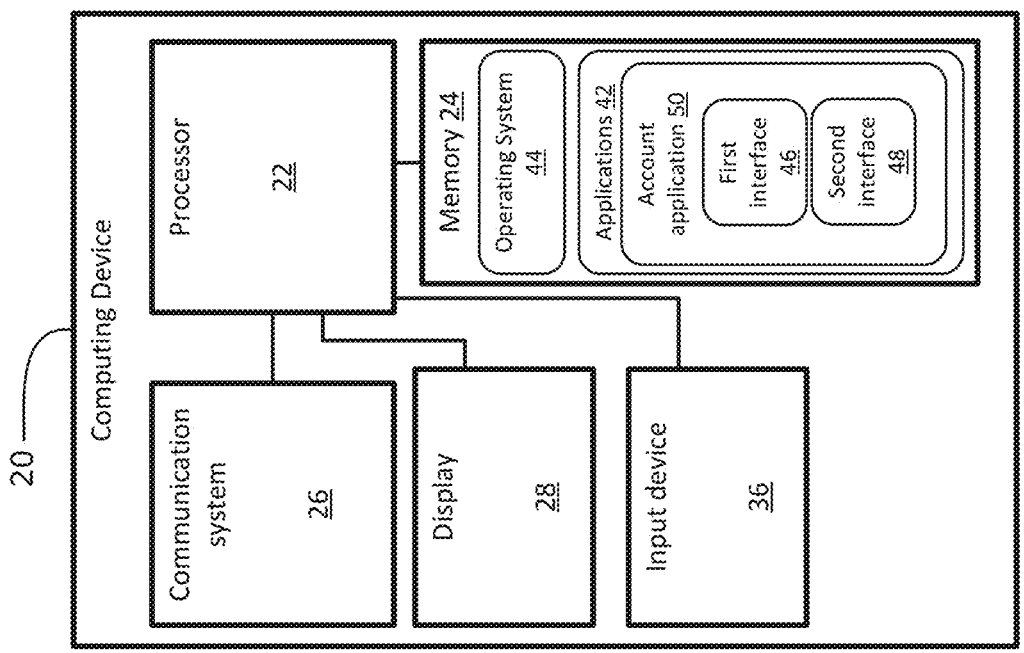
FIG. 1 diagrammatically shows an example system to conditionally alter interface speed of interaction.
Figure 1:
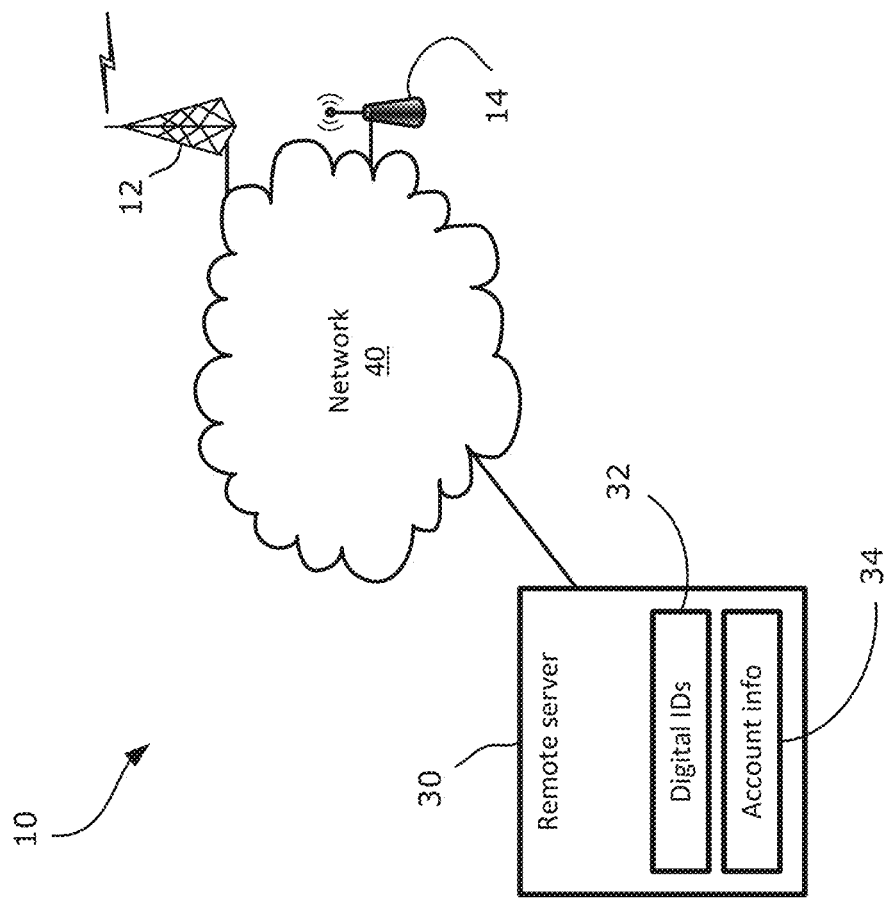

In a first aspect, the present application describes a computing device to conditionally alter interface speed of interaction. The computing device includes a processor; a communications system coupled to the processor for communicating over a network with a remote server; a display coupled to the processor; an input device coupled to the processor to receive input; and memory coupled to the processor and storing processor-readable instructions. When executed, the instructions cause the processor to receive, from the input device, a digital ID; send a request to and receive a response from the remote server, the response indicating that the digital ID is associated with one or more accounts including at least one credit account; receive, from the input device, an instruction to initiate a data exchange with the at least one credit account; send, to the remote server, a request to initiate the data exchange with the at least one credit account; and, receive, from the remote server, information indicating whether the data exchange, when implemented, would result in the at least one credit account exceeding a utilization threshold. When the utilization threshold would not be exceeded, the processor displays an interface on the display to enable completion of the data exchange in a first period of time, the interface including an input field, and pre-populates the input field with a default entry; and when the utilization threshold would be exceeded, the processor displays a modified interface different from the interface to enable completion of the data exchange in a second period of time longer than the first period of time, the modified interface including the input field without a pre-populated default entry, and receives, via the input device, an active input with respect to the input field.

In another aspect, the present application describes a method of conditionally altering speed of transactions on a computing device having an input device and a display, the computing device being configured to communicate with a remote server over a data network. The method includes receiving a digital ID from the input device; determining that the digital ID is associated with one or more accounts including at least one credit account; receiving, from the input device, a request to initiate a data exchange with the at least one credit account; and, determining whether the data exchange, when implemented, would result in the at least one credit account exceeding a utilization threshold. The method further includes, when the utilization threshold would not be exceeded, displaying an interface on the display to enable completion of the data exchange in a first period of time, the interface including an input field, and pre-populating the input field with a default entry; and when the utilization threshold would be exceeded, displaying a modified interface different from the interface to enable completion of the data exchange in a second period of time longer than the first period of time, the modified interface including the input field without a pre-populated default entry, and receiving, via the input device, an active input with respect to the input field.

In a further aspect, the present application describes a server to conditionally alter the speed of transactions on a computing device, the computing device having a display. The server includes a processor; a communications interface coupled to the processor for communicating over a network with the computing device; and, memory coupled to the processor and storing processor-readable instructions. The instructions, when executed, cause the processor to receive, from the computing device, a digital ID; determine that the digital ID is associated with one or more accounts including at least one credit account; receive, from the computing device, a request to initiate a data exchange with the at least one credit account; and determine whether the data exchange, when implemented, would result in the at least one credit account exceeding a utilization threshold. The instructions further cause the processor to, when the utilization threshold would not be exceeded, instruct the computing device to display an interface on the display to enable completion of the data exchange in a first period of time, the interface including an input field, and pre-populate the input field with a default entry; and when the utilization threshold would be exceeded, instruct the computing device to display a modified interface different from the interface to enable completion of the data exchange in a second period of time longer than the first period of time, the modified interface including the input field without a pre-populated default entry, and receive, via the input device, an active input with respect to the input field.

In yet a further aspect, the present application describes non-transitory computer-readable media storing computer-executable program instructions which, when executed, configure a processor to perform one or more of the described methods. In this respect, the term processor is intended to include all types of processing circuits or chips capable of executing program instructions.

Other aspects and features of the present application will be understood by those of ordinary skill in the art from a review of the following description of examples in conjunction with the accompanying figures.

Many of the example embodiments described herein relate to financial account management software. It will be understood that some aspects of the present application are not limited to financial accounts and may be applied to interfaces relating to transactions or management of 'accounts' that are non-financial in nature. Example financial accounts may include those for banking, trading, or investment, which may include asset-type accounts or credit accounts. In some cases an account may be both an asset account and a credit account, such as in the case of a financial savings or checking account that has an overdraft facility enabling the borrowing of funds when the account goes into a deficit position. An example of a non-financial account may include an account within a gaming environment that may have non-monetary credits and debits associated with it. Such accounts may be associated with any one of a number of non-financial industries. Accordingly, the present application is not limited to the dynamic modification of financial account management interfaces, but may be applied to the dynamic modification of non-financial account management interfaces.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The creators of modern software for initiating and controlling transactions, particularly those relating to various accounts, strive for ubiquity and ease-of-use. To this end, much focus has been placed on providing easy access to account information and easy initiation of transactional operations in connection with accounts from a variety of computing devices. Example computing devices may include conventional personal computers (e.g., laptops or desktops), mobile devices (e.g. smartphones), tablets, smartwatches, and the like. Software operating on such computing devices enables access to account information stored and controlled by a remote server or servers. Many applications permit the initiation of transactional operations in connection with one or more of the accounts, including a variety of financial operations. Examples may include bill payments, transfers between accounts, payment for online orders of goods or services, electronic funds transfers to third parties (e.g. e-mail money transfers), purchases or sales of financial instruments or securities, and other online transactions involving one or more accounts.

In some cases, the ease with which the associated data exchange (i.e. transaction associated with an account) may be made may lead users into difficulty in managing risk and determining exposure. Because the requested data exchange is designed to function as fast as possible with a minimum of user input before completing the data exchange, in some instances a data exchange may be made hastily and completed too quickly. This issue may occur, for example, in connection with a credit account where a hastily concluded transaction may result in utilization of the credit facility to a degree that, while within the limits of the available credit for the account, results in strain in allocating resources.

It may be advantageous to provide for a system and computing device that addresses the ease with which data exchange operations may result in inadvertent resource scarcity. In one aspect, the present application provides for a system that determines whether a requested credit account data exchange will exceed a utilization threshold level for the credit account. If so, then the system modifies the displayed interface from a first interface, through which the data exchange may be completed in a first time, to a second interface, through which the data exchange may be completed in a second time longer than the first time. As will be described below, various modifications may be made to the interface to result in a delayed completion of the data exchange without blocking the data exchange altogether and without delaying the data exchange to a degree that the interface becomes overly frustrating.

Modifications to a display interface to slow down completion of a transaction may include reduced speed of responsiveness of one or more of the display elements or input mechanisms, in one example. In another example, the interface may be modified to solicit additional input, or to remove or reduce one or more default selections thereby necessitating additional active input of selection of a parameter or setting before proceeding. Other example implementations will be described below.

The determination to modify an interface to slow down completion of a data exchange may be made based on a determination of whether the requested data exchange will result in exceeding a utilization threshold for the associated credit account. The utilization threshold may be a preset percentage of use of the credit available, for example. In some embodiments the utilization threshold may be a percentage of all available credit facilities associated with a user including the current credit account associated with the requested data exchange. In some other embodiments a more context-dependent threshold may be used, such as one in which the percentage is dependent on a recent (perhaps weighted) pattern of credit and debit data exchanges in the credit account alone, or across the credit account and one or more other accounts. In some cases, the determination may take into account data associated with an account other than the credit account.

In some embodiments, the utilization threshold may be determined dynamically rather than preset. For example, the determination may assess the pattern (in some cases, weighted to emphasize more recent data) of funds being credited and debited to a main savings or checking account so as to assess a trajectory of growth or decline in available funds to service debt. In some cases, this assessment accounts for debits that have gone to reduce outstanding credit balances as opposed to non-debt-reduction expenditures.

Irrespective of whether it is determined dynamically or predetermined, or whether it is expressed as a percentage of a credit limit, a percentage of income, a fixed value, or in any other form, the utilization threshold is a numerical threshold against which the proposed data exchange is evaluated to determine whether the proposed data exchange will result in exceeding the threshold. This may, in some cases, mean that the used credit exceeds a threshold value or percentage of the credit facility, or that the used credit and associated interest payment exceeds a threshold payment quantity or percentage of periodic income. Other mechanisms for expressing the utilization threshold in relation to the credit account or other accounts and for evaluating whether a proposed data exchange associated with the credit account exceeds such a utilization threshold will be appreciated by those having ordinary skill in the art in light of the present description.

Reference is now made to FIG. 1, which shows an example system 10 to conditionally alter interface speed of interaction. The system 10 includes a computing device 20 and a remote server 30. The remote server 30 and computing device 20 are configured to communicate digitally over one or more networks 40, which may include public networks (e.g. the Internet), private networks, VPNs, wired networks, wireless networks, and combinations thereof. The remote server 30 may be implemented using one or more computing devices having processing resources and memory resources, being configured to receive and respond to requests from computing devices in relation to account information. The remote server 30 stores digital ID 32 information, such as login credentials or the like, and associations between digital IDs 32 and account information 34. The account information 34 may include details regarding various accounts associated with each digital ID 32 and associated information, such as transaction history, balance, trading or usage parameters or restrictions, and other data relating to the accounts.

The computing device 20 may, in some embodiments, be a personal computer such as a laptop or desktop computer. In some embodiments, it is a mobile device, such as a smartphone, tablet, phablet, smartwatch, or combination thereof. The computing device includes at least one processor 22, memory 24 and a communication system 26. The communication system 26 may include subsystems for wired or wireless data communication and wired or wireless voice communication. In some examples, the communication system 26 includes a subsystem for cellular data and voice connectivity via a cellular system 12. The cellular system 12 may include system operating in accordance with one or more of a variety of cellular voice and data protocols for connectivity and communication, including 5G, 4G and 3G systems. The communication system 26 may further include a subsystem for wireless local area network (WLAN) connectivity with an access point 14, which may operating in accordance with the IEEE 802.11 protocol, for example. The communication system 26 may provide the computing device 22 with other wired or wireless connections for accessing the networks 40.

The computing device 20 includes a display 28 and at least one input device 36. The at least one input device 36 may include a touch sensitive overlay on the display 28 for detecting touch-based input, for example. Other examples of the input device 36 may include a keyboard, keypad, touchpad, mouse, keyboard with touch-sensitive surface, or various buttons. In one example, the input device 36 may include a motion sensor, such as a gyroscope or accelerometer for detecting movement of the computing device 20 and identifying and classifying gestures as part of a gesture-based input process. In some cases, the input device 36 includes a port or other communication path for receiving input via an external peripheral device, such as a mouse, keyboard, wand, pen, smartphone, smartwatch, etc.

The memory 24 may include volatile and non-volatile memory. At least a part of the memory 24 may store processor-readable instructions that, when executed by the processor, cause the processor to carry out some of the operations described herein. The processor-readable instructions stored in memory 24 may include an operating system 44 that implements basic device functions and creates a run-time environment within which other software is executed. The memory 24 may also store a plurality of applications 42, where the term "application" refers to a set of program-executable instructions that configure or adapt the processor 22 to carry out a particular algorithm or set of steps or operations. Example applications 42 may include a messaging application, a word processing application, a calculator, a calendar, a music library, a social media application, a browser, or other such applications. The applications 42 may include an account application 50 configured to enable account-related data exchange operations with the remote server 30.

The account application 50 may include processor-readable instructions that, when executed, cause the processor 22 to implement some of the operations described herein, such as the conditional modification of an interface displayed on the display 28 based on a determination as to whether a requested data exchange in connection with a credit account on the remote server 30 would exceed a utilization threshold. In this respect, the account application 50 may generate either a first interface 46 or a second interface 48. The respective interfaces 46 and 48 are illustrated as separate components of the account application 50 for ease of illustration and description but it will be appreciated that in some implementations the interfaces 46 and 48 may be generated by a common block or portion of, for example, mark-up language code having conditional statements that implement features of the first interface 46 and second interface 48, respectively.

Figure 2:
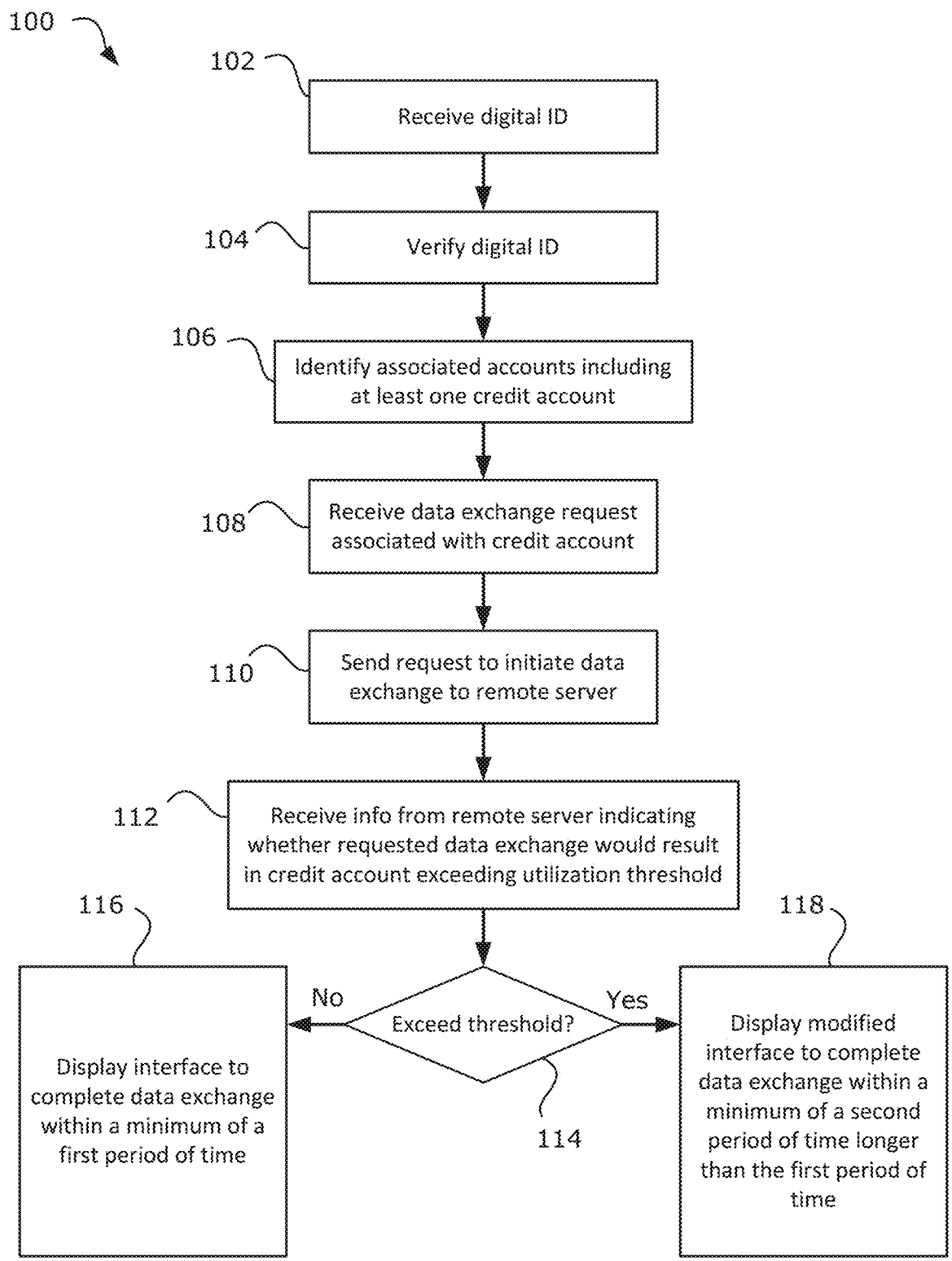
FIG. 2 shows, in flowchart form, one example method for dynamically modifying an interface.

Reference is now made to FIG. 2, which shows, in flowchart form, one example process 100 for conditionally modifying an interface. In this example method 100, the described operations are carried out by the computing device 20 (FIG. 1) in the course of accessing account information at the remote server 30 (FIG. 1). The method 100 may be implemented, at least in part, through processor-executable instructions in the account application 50, although in some other embodiments one or more of the operations is implemented via processor-executable instructions in another application 42 or in the operating system 44.

The method 100 may begin with receipt of a digital ID in operation 102. The digital ID may be input via one of the input devices, such as a keypad, keyboard, touchscreen, etc. In some cases, the digital ID may be input through non-conventional input devices, for example a voice input via a microphone, a fingerprint scan, an iris scan, or other biometric input. The digital ID may include more than one input, such as a username and a password, for example.

In operation 104, the computing device verifies the digital ID. This may include forwarding all or part of the digital ID to the remote server for authentication in some cases. The verification may include verification or authentication operations both at the computing device and at the remote server. Once the digital ID has been verified as authentic, then the associated accounts are identified in operation 106. This may include providing the remote server with the digital ID or related information associated with the digital ID. The remote server may identify associated accounts and may provide account details to the computing device. The accounts include at least one credit account in this example. The computing device may be configured to display at least some of the account information on the display. For example, it may list the associated accounts, their balances, holdings, recent transactions, pending transactions, etc. The computing device may further provide menus, buttons, icons, or other selectable graphical elements for initiating various operations in connection with one or more of the accounts.

In operation 108, the computing device receives a data exchange instruction. The data exchange instruction is associated with at least one credit account identified in operation 106. The data exchange instruction may be received via any of the input devices, such as through a gesture, a touch-screen command, a keyboard or keypad input, a mouse click, etc. The command may be received via an actuation of a selectable menu item, icon, or other graphical element associated with the instruction. The data exchange instruction may, as an example, include an instruction regarding funds transfer from the credit account to another account. In some cases, it may include a purchase request reliant upon a line-of-credit or margin account. The purchase request may be a securities trading request in some embodiments.

In operation 110, the computing device transmits, to the remote server, a request to initiate the data exchange. The request may indicate the accounts involved and, in some cases, the quantity of resources involved.

At operation 112, the computing device receives from the remote server information indicating whether the requested data exchange would, if implemented, result in the credit account exceeding a utilization threshold. Examples of the utilization threshold are described above. The information received from the remote server may include details of the utilization threshold from which the computing device is able to assess whether the request exceeds the threshold. In other embodiments, the information may be a flag, code, or other data indicative of whether the data exchange would exceed the utilization threshold.

In operation 114, the computing device assesses whether the data exchange would exceed the utilization threshold and, if not, then in operation 116 it generates and displays a first interface for completion of the data exchange. The first interface permits completion of the data exchange within a first time period. As an example, the first interface may feature a confirmation button for selection. As another example, the first interface is a confirmation page indicating that the requested data exchange has been completed and requiring no further input.

If in operation 114, it is determined by the computing device that the data exchange would exceed the utilization threshold, then in operation 118 the computing device displays a second interface for completion of the data exchange different from the first interface. The second interface may be substantially similar to the first interface but may be modified in one or more respects. In one example, the second interface may include an input field, button, menu selection, or other solicitation for input that does not appear in the first interface. In another example, the second interface requires additional active inputs because it does not pre-populate one or more fields or selections that are pre-populated in the first interface. In yet another example, an input operation in connection with the second interface, such as a touch-screen based drag operation, functions more slowly or with greater inherent delay in visual operation that the same operations functions in the first interface. In yet a further example, the second interface involves a pop-up confirmation screen or the like that does not appear in connection with the first interface.

The second interface enables completion of the data exchange in a second period of time longer than the first period of time. The first period of time and the second period of time are minimum times within which it is possible to complete the data exchange. By ensuring that the second period of time is longer than the first period of time, there is extra time available to cancel or reconsider the data exchange, which may be significant due to the fact it will lead to the credit account exceeding the utilization threshold, but it does not prevent completion of the data exchange or, in some cases, appear significantly slower or more cumbersome.

In some embodiments, the computing device receives utilization threshold information earlier in the process 100, for example when verifying the digital ID, which enables the computing device to perform the function of assessing whether a newly-requested data exchange would exceed the utilization threshold without necessarily requesting that information from the remote server.

Figure 3:
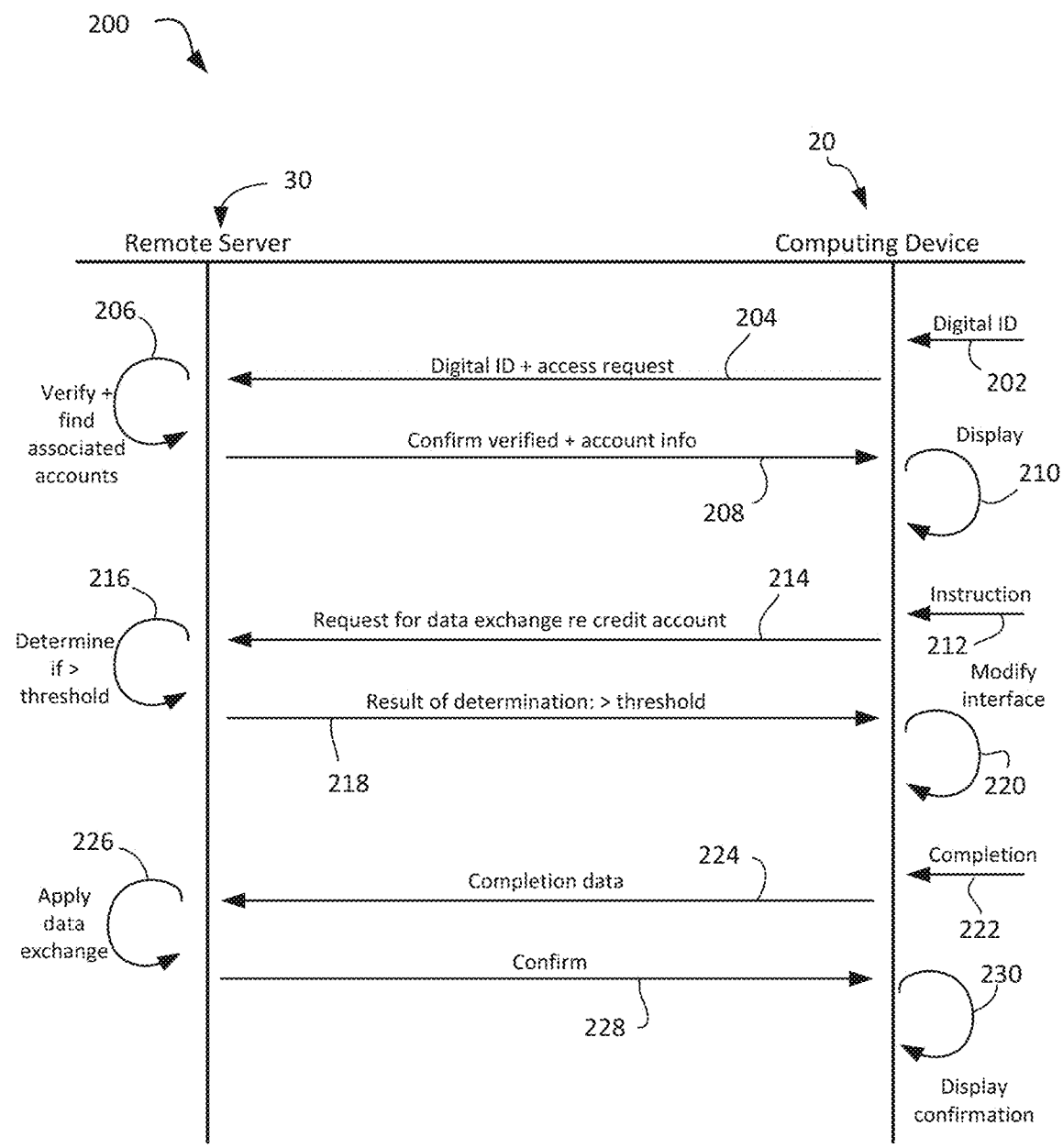
FIG. 3 shows an example signal diagram for communications between a remote server and a computing device to dynamically modify an interface.

Reference is now made to FIG. 3, which is an example signal diagram 200 diagrammatically illustrating signaling or messaging exchanged between the remote server 30 and the computing device 20 in connection with modifying an interface. The example signal diagram 200 shows receipt, in operation 202, by the computing device 20 of an input digital ID. The input digital ID may be input into a login interface of the account application 50 (FIG. 1), for example. The digital ID may be input in the form of a username, alphanumeric password, picture password, gesture, biometric input, or the like.

In this example, the computing device 20 then in operation 204 transmits the digital ID and an access request to the remote server 30, which then verifies in operation 206 the digital ID and locates the account information associated with the digital ID if the digital ID is authenticated. Note that in some embodiments, the authentication of the digital ID may take place on the computing device 20 prior to transmission of the access request in operation 204 and, in some embodiments, additional authentication or verification operations may occur at the remote server 30.

Once the account information has been located, it is sent to the computing device 20 in operation 208. In operation 210, the computing device 20 then generates a display in accordance with the design of the account application for outputting some of the account information and providing selectable options for account functions. The account information includes details of one or more accounts, including at least one credit account. Examples may include one or more checking accounts, one or more mortgages, one or more credit cards, one or more lines-of-credit, one or more investment accounts, etc. The account information may include balances, recent transactions, upcoming pre-scheduled transactions, credit available, and other account details.

In operation 212, the computing device 20 receives an instruction with respect to one of the credit accounts. The instructions may be any one of a variety of possible operations or functions with respect to one or more of the accounts provided it is to result in drawing credit from the credit account. In one example, the instruction may be a funds transfer from the credit account to another account. In another example, the instruction may be a bill payment to be drawn from the credit account. In yet another example, the instruction may be a trading instruction (e.g. purchase of a stock, bond, option, mutual fund, exchange traded fund, etc.) using a margin account (i.e. credit account). Other example instructions will be understood in light of the description herein.

The instruction is received by the computing device 20 via the interface of the account application 50, for example, through selection of an icon, menu item, or other GUI element associated with the instruction. The received instruction may further include receipt of additional details, such as the amount, such as in the case of a funds transfer instruction between accounts.

In this embodiment, the computing device 20 then sends a request for data exchange to the remote server 30 in operation 214. The request for data exchange includes at least some details of the instruction. In operation 216, the remote server 30 determines whether implementation of the instruction would result in the credit account exceeding its associated utilization threshold. In some embodiments, each credit account has its own associated utilization threshold. In some other embodiments, each credit account associated with a digital ID shares the same utilization threshold. As an example, the threshold may be a fixed percentage of the available credit. As another example, the threshold may be a percentage of the available credit that varies dependent upon data from one or more other accounts. For example, the percentage may be at least partly based upon available funds in another account, such as a checking account, a savings account or an investment account. In some examples, the percentage may be determined based in part upon recent transactions in one or more other accounts. As an example, the percentage may be partly based on the recent debits and credits to a checking account. For instance, if the recent pattern of debits and credits has shown a pattern of a declining balance in the available funds in a checking account then the utilization threshold may be set to a lower percentage. In yet another example, the utilization threshold may reflect a size of the minimum payment required to service the debt load associated with the credit account. In such an example case, the utilization threshold may be fixed or may be dynamically determined, such as based upon a recent history of credits to one or more of the checking or savings accounts, thereby indicating the incoming cash flow available to service the debt load.

In some other example embodiments (not shown), the determination of whether the instruction will result in the credit account exceeding its associated utilization threshold is performed by the computing device 20. In such examples, the computing device 20 may receive details of the utilization threshold from the remote server 30 in operation 208 when the remote server 30 sends account information.

The remote server 30 transmits a reply message to the computing device 20 in operation 218 indicating whether the request for data exchange results in the credit account exceeding its utilization threshold. Assuming, for the purposes of this example, that the determination is that the request for data exchange will result in the credit account exceeding its utilization threshold, then in operation 220 the computing device modifies the display interface so as to display a modified display interface. The modified display interface enables completion of the instruction with respect to the credit account, but includes a modification vis-à-vis the ordinary or usual display interface that increases the minimum time required to complete the instruction. In some examples, the modification includes adding an input field, checkbox, pulldown selection, or other input requirement to the modified user interface that does not appear in the regular display interface. In some example, the modification includes not pre-populating a selection that is pre-populated with a default selection in the regular display interface. In some examples, the regular display interface requires no further input following the input received in operation 212 that results in the request for data exchange in operation 214, and the data exchange is simply completed in response to the determination that the utilization threshold will not be exceeded, whereas if the determination is that the utilization threshold will be exceeded then the modification is to require at least some further input. The further input solicited may include a confirmation popup window, an extra selection input, or other such input. In yet another example, the modification may include slowing the graphical operation of a subsequent operation prior to completion of the request for data exchange. As an illustration, the subsequent operation may include a touch-based graphical "drag" of the specified funds to a field or icon representing the account to which the funds are to be transferred. In the case of the modified display interface, the drag operation may have a longer lag in its displayed operation than in the case of the unmodified display interface. In another instance, the slower graphical operation may be a graphical transition or animation that is displayed more slowly than it otherwise would be displayed. In yet a further example, the modification may include display of a chat or instant messaging window or field that initiates a session with a credit counseling specialist.

In some implementations, the display interface and the modified display interface are generated from the same code (e.g. set of mark-up language instructions) and the modifications are implemented by way of conditional instructions or operations within the code wherein the condition is dependent upon the result of operation 216. That is, the result of the determination as to whether the credit account exceeds its threshold will, if true, result in execution of the conditional code implementing the modified user interface portion of the display interface code.

In operation 222, the request for data exchange is completed. This may include receiving one or more further inputs or selections relating to the data exchange, as described above, via the modified user interface. The computing device 20 then transmits completion data to the remote server in operation 224, which then applies the data exchange in operation 226. The data exchange may include, for example, the transfer of funds between accounts, in which case applying the data exchange includes debiting the value of one account and crediting the value of another account. A confirmation message is returned to the computing device 20 in operation 228, and the computing device 20 outputs a confirmation display in operation 230.

In some embodiments, the credit account has more than one utilization threshold and the nature of the modification to the display interface may differ based on whether the requested data exchange exceeds one or more of the thresholds. For example, as the requested data exchange exceeds higher and higher thresholds, the modifications applied to the display interface may become more and more intrusive, thereby introducing longer and longer delays in completing the data exchange.

Figures 4, 5:
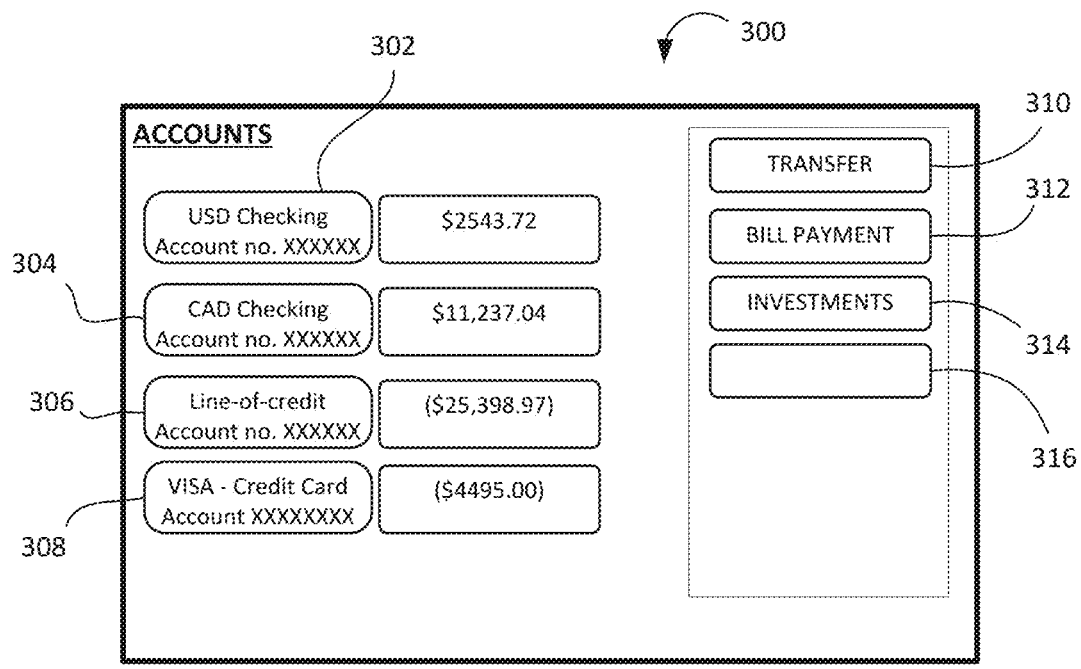
FIG. 4 shows one example of an account management interface.
FIG. 5 shows one example of a funds transfer interface.

Reference is now made to FIG. 4, which shows one simplified example of a display interface 300 for an account application. The display interface 300 is a graphical user interface rendered on the display of a computing device. In some cases, the display interface 300 includes a plurality of selectable icons or other elements having associated embedded links and other mark-up language functions. The display interface 300 may be shown on a touch-screen enabled display screen in some implementations, thereby enabling touch-based selection of links or operations. In other cases, the selection of links or other operations in connection with the display interface 300 may be through keypad, keyboard, mouse, trackpad, voice, or gesture-based inputs.

In this simplified example, the display interface 300 lists a plurality of accounts, such as a US dollar (USD) checking account 302, a Canadian dollar (CAD) checking account 304, a line-of-credit (LOC) account 306, and a credit card account 308. Other accounts may be listed in other examples, including trading accounts, retirement accounts, savings accounts, mortgage accounts, etc. The displayed information regarding the accounts may include, for example, the account type, the account number, and account balance. In many cases, the account name or number is selectable to navigate to a submenu showing further details regarding the account, such as recent transactions and further operations selectable in connection with that account.

The display interface 300 also provides a plurality of selectable operations. In this example, the selectable operations are shown as icons or buttons, however, it will be appreciated that other designs for the display interface 300 may provide for selectable operations within pull down menus, side menus, etc., using other user-interface design styles. The example operations shown in the display interface 300 includes a transfer icon 310, a bill payment icon 312, an investment purchase icon 314, and other account operation icons 316.

Reference is now also made to FIG. 5, which shows a simplified example of a funds transfer display interface 320. The funds transfer display interface 320 includes a from field 322. The from field 322 may be implemented as a pull down menu that displays the available accounts from which funds may be withdrawn. A to field 324 offers selection of an account to which funds may be transferred. An amount field 326 provides an input area to receive data indicating the amount. In some embodiments, a default amount may be provided. In some embodiments a list of possible amounts may be offered for easy selection as well as the possibility of specifying a different amount with additional input. A confirm button 328 results in generation of the request for data exchange, provided the other fields have been completed and the entries do not violate any input restrictions or parameters, e.g. leaving a selection blank or making an invalid selection or input.

In the case where the funds transfer request relates to withdrawing funds from a credit account to be transferred to another account, the requested operation is evaluated for compliance with the utilization threshold of the credit account. The computing device or the remote server determine whether the requested funds transfer will result in the credit account exceeding its utilization threshold and, if so, the computing device displays a modified interface. Otherwise, the computing device carries on with the funds transfer request using an unmodified interface, such as the funds transfer display interface 320, for example. In some cases, the determination occurs after the confirm button 328 is selected. In some cases, the determination occurs after the credit account is selected in the from field 322 and an amount is entered in the amount field 326. The determination may be carried out in near-real-time as numbers are entered into the amount field 326 so that as each new number is entered and changes the total amount a new determination is made as to whether the utilization threshold is exceeded.

Figure 6:
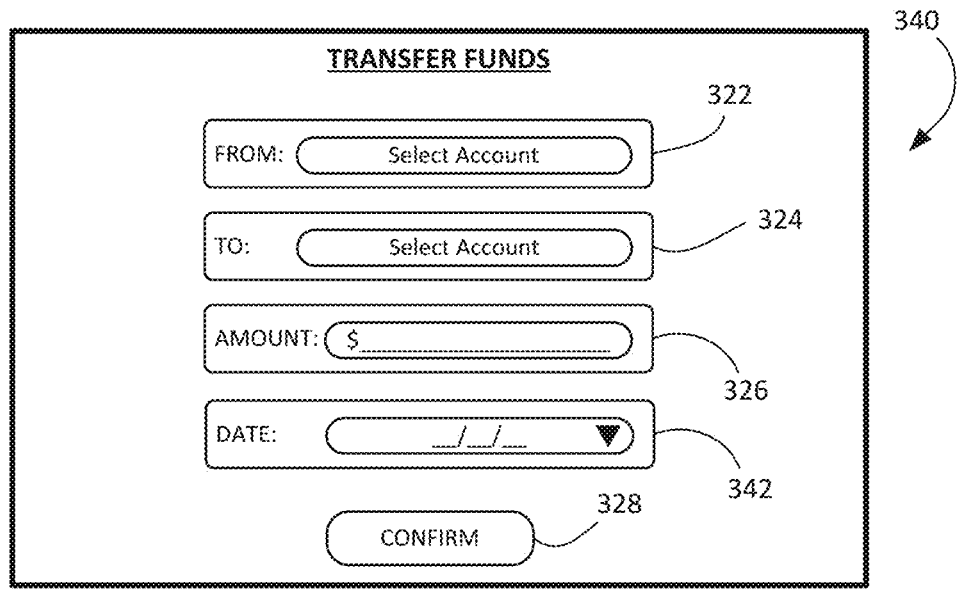
FIG. 6 shows one example of a modified funds transfer interface.

Reference is now also made to FIG. 6, which shows one simplified example of a modified funds transfer display interface 340. In this example, the modified funds transfer display interface 340 includes the from field 322, the to field 324, the amount field 326, and the confirmation button 328. In this example, the modified funds transfer display interface 340 includes an additional input field. In this illustrative example, the additional input field is a date field 342; however, it may be any other field soliciting further input.

Figure 7:
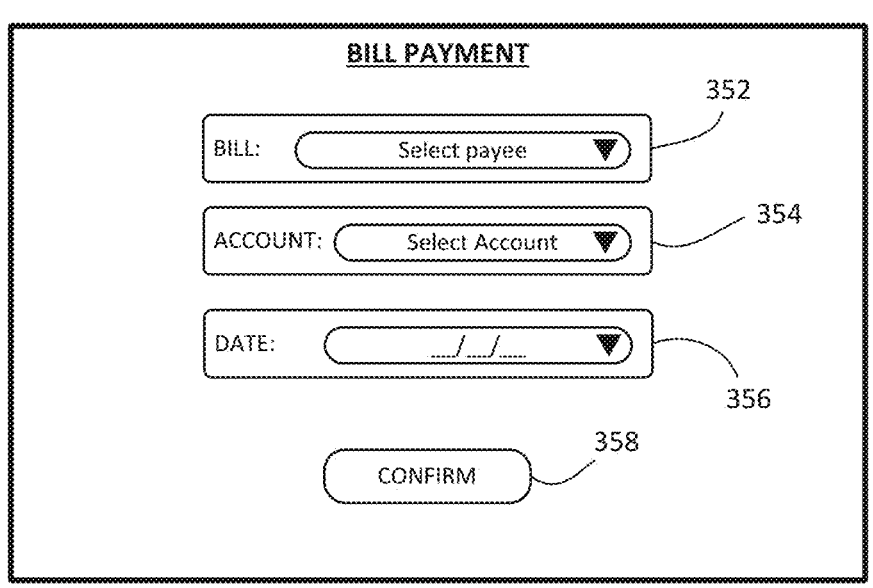
FIG. 7 shows one example of a bill payment interface.

Another example display interface is shown in FIG. 7, which illustrates a simplified example of a bill payment interface 350. The bill payment interface 350 includes a bill selection field 352 through which a specific payee and the amount owed may be selected, for example using a pull-down menu of options. In this example, bills are received electronically such that the amount and the payee are already indicated in the menu options for the bill selection field 352. Also included is an account selection field 354. This may also be implemented as a pull-down menu of available accounts, in some examples. The bill payment interface 350 in this example also includes a date field 356 for specifying the date on which the payment is to be made and a confirmation button 358.

In this example, having selected a bill for payment and an account from which payment is to be made, if the account selected is a credit account then the computing device determines whether the proposed payment would result in exceeding the utilization threshold. The date field 356 may default to the current date such that in the normal course the date need not be selected if the user wishes to make the payment immediately. Only the confirmation button 358 need be pressed to finalize the transaction. However, once the account selected is a credit account and the determination has been made that the amount to be paid will result in the credit account exceeding its utilization threshold, then the bill payment interface 350 may be modified so that the date field 356 no longer has a default selection, thereby necessitating active selection of a date. This modification results in minor delay to the minimum time in which the transaction may be completed as the computing device may refuse to recognize selection of the confirmation button 358 until a date is actively selected.

In other embodiments, the modification includes causing a pop-up screen that does not otherwise appear. In some embodiments, modification includes causing a delay in display of a next page or next field during a transaction. In some embodiments, modification includes causing launch of a window with which a user must interact prior to proceeding, such as a chat window connecting a user to a credit counseling specialist. Other modifications to result in a modified user interface that results in delaying completion of the transaction for a period of time will be appreciated by those of ordinary skill in the art. It will also be appreciated that the modification does not include preventing completion of the transaction completely, or the refusal of the data exchange request, since the credit account has sufficient credit available.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing device to conditionally alter interface speed of interaction, the computing device comprising:
   a processor;
   a communications system coupled to the processor for communicating over a network with a remote server;
   a display coupled to the processor;
   an input device coupled to the processor to receive input; and
   memory coupled to the processor and storing processor-readable instructions that, when executed, cause the processor to:
     receive, from the input device, a digital ID;
     send a request to and receive a response from the remote server, the response indicating that the digital ID is associated with one or more accounts including at least one credit account;
     receive, from the input device, an instruction to initiate a data exchange with the at least one credit account;
     send, to the remote server, a request to initiate the data exchange with the at least one credit account;
     receive, from the remote server, information indicating whether the data exchange, when implemented, would result in the at least one credit account exceeding a utilization threshold;
     when the utilization threshold would not be exceeded:
       display an interface on the display to enable completion of the data exchange in a first period of time, the interface including an input field; and
       pre-populate the input field with a default entry;
     when the utilization threshold would be exceeded:
       display a modified interface different from the interface to enable completion of the data exchange in a second period of time longer than the first period of time, the modified interface including the input field without a pre-populated default entry; and
       receive, via the input device, an active input with respect to the input field.

2. The computing device claimed in claim 1, wherein the active input is an active selection.

3. The computing device claimed in claim 2, wherein the input field is a selection field.

4. The computing device claimed in claim 2, wherein the input field is a date field.

5. The computing device claimed in claim 1, wherein the modified interface requires receipt of the active input with respect to the input field and the interface does not require receipt of the active input with respect to the input field.

6. The computing device claimed in claim 1, wherein the modified interface includes a chat window and wherein the interface does not include the chat window.

7. The computing device claimed in claim 1, wherein displaying the modified interface different from the interface comprises adding delay to the visual operation of an input operation of the interface to generate the modified interface.

8. The computing device claimed in claim 7, wherein the input operation is a touch-screen based drag operation.

9. A method of conditionally altering speed of transactions on a computing device having an input device and a display, the computing device being configured to communicate with a remote server over a data network, the method comprising:
   receiving a digital ID from the input device;
   determining that the digital ID is associated with one or more accounts including at least one credit account;
   receiving, from the input device, a request to initiate a data exchange with the at least one credit account; and,
   determining whether the data exchange, when implemented, would result in the at least one credit account exceeding a utilization threshold and,
     when the utilization threshold would not be exceeded:
       displaying an interface on the display to enable completion of the data exchange in a first period of time, the interface including an input field; and
       pre-populating the input field with a default entry;
     when the utilization threshold would be exceeded:
       displaying a modified interface different from the interface to enable completion of the data exchange in a second period of time longer than the first period of time, the modified interface including the input field without a pre-populated default entry; and
       receiving, via the input device, an active input with respect to the input field.

10. The method claimed in claim 9, wherein the active input is an active selection.

11. The method claimed in claim 10, wherein the input field is a selection field.

12. The method claimed in claim 10, wherein the input field is a date field.

13. The method claimed in claim 9, wherein the modified interface requires receipt of the active input with respect to the input field and the interface does not require receipt of the active input with respect to the input field.

14. The method claimed in claim 9, wherein the modified interface includes a chat window and wherein the interface does not include the chat window.

15. The method claimed in claim 9, wherein displaying the modified interface different from the interface comprises adding delay to the visual operation of an input operation of the interface to generate the modified interface.

16. The method claimed in claim 15, wherein the input operation is a touch-screen based drag operation.

17. A server to conditionally alter the speed of transactions on a computing device, the computing device having a display, the server comprising:
   a processor;
   a communications interface coupled to the processor for communicating over a network with the computing device; and,
   memory coupled to the processor and storing processor-readable instructions that, when executed, cause the processor to:
     receive, from the computing device, a digital ID;
     determine that the digital ID is associated with one or more accounts including at least one credit account;
     receive, from the computing device, a request to initiate a data exchange with the at least one credit account;

determine whether the data exchange, when implemented, would result in the at least one credit account exceeding a utilization threshold;

when the utilization threshold would not be exceeded:

display an interface on the display to enable completion of the data exchange in a first period of time, the interface including an input field; and pre-populate the input field with a default entry;

when the utilization threshold would not be exceeded:

display a modified interface different from the interface to enable completion of the data exchange in a second period of time longer than the first period of time, the modified interface including the input field without a pre-populated default entry; and receive, via the input device, an active input with respect to the input field.

18. The server claimed in claim 17, wherein the active input is an active selection.

19. The server claimed in claim 18, wherein the input field is a selection field.

20. The server claimed in claim 18, wherein the input field is a date field.

* * * * *